Nov. 6, 1923.  1,473,335
E. M. CHANDLER
ATTACHMENT FOR UTENSILS
Filed Jan. 21, 1922
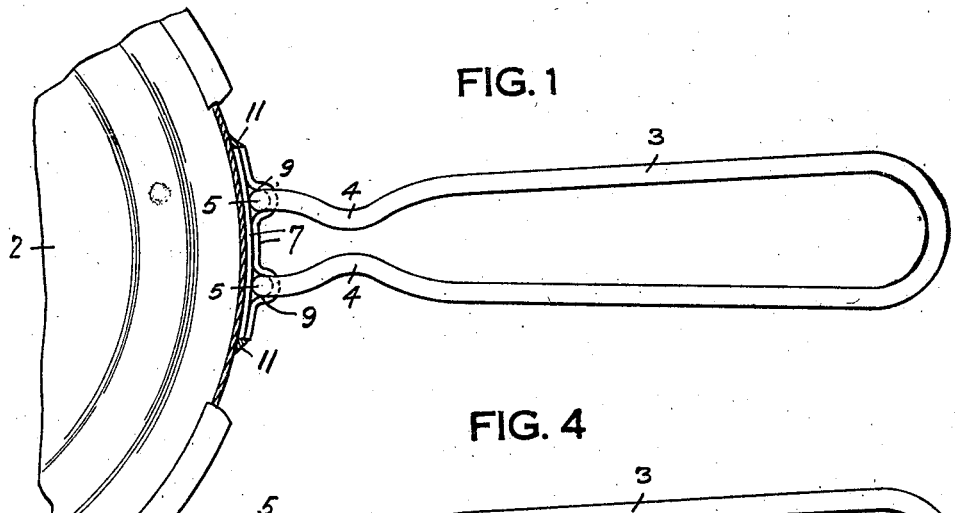
FIG. 1
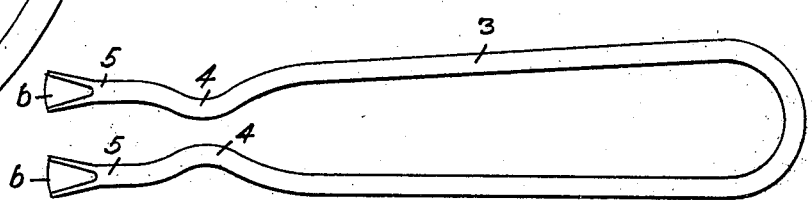
FIG. 4
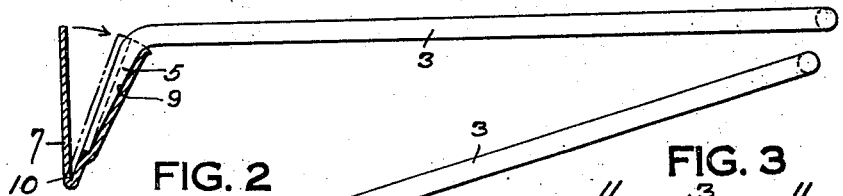
FIG. 5
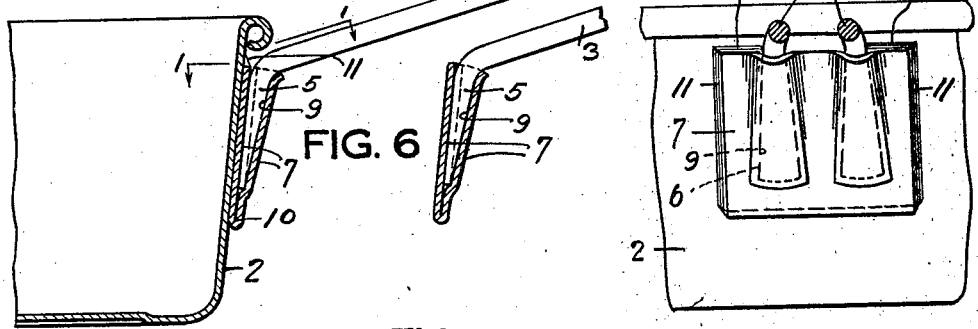
FIG. 2    FIG. 3
FIG. 6
FIG. 7   FIG. 8
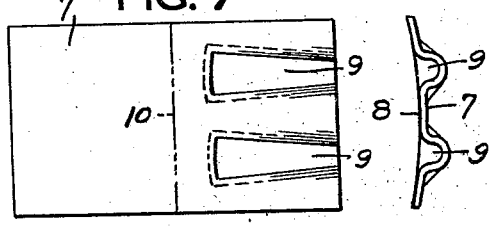
INVENTOR
Edward M. Chandler Patented Nov. 6, 1923.

1,473,335

UNITED STATES PATENT OFFICE.

EDWARD M. CHANDLER, OF NEW KENSINGTON, PENNSYLVANIA.

ATTACHMENT FOR UTENSILS.

Application filed January 21, 1922. Serial No. 530,949.

*To all whom it may concern:*

Be it known that I, EDWARD M. CHANDLER, a citizen of the United States, and resident of New Kensington, in the county of Westmoreland and State of Pennsylvania, have invented a new and useful Improvement in Attachments for Utensils; and I do hereby declare the following to be a full, clear, and exact description thereof.

My invention relates to attachments, such as handles, ears, rings, clips, etc., for cooking or other utensils.

In the case of cooking or other utensils made of aluminum, it has been customary heretofore to form the handles, ears, rings, clips, etc. of steel secured by rivets to the utensil. Due to the unequal expansion and contraction of these dissimilar metals when subjected to heat, the attachments were liable to work loose and in time become completely detached. Furthermore, this mode of attachment was insanitary in that it allowed dirt, grease or other matter to collect in and around the rough spots where the rivets were located, making cleaning difficult, and furthermore as the parts became loose water or other fluid gained admittance, which resulted in the rusting and corroding of the steel.

The object of my invention is to provide a simple and efficient means of securing the various kinds of attachments to cooking or other utensils where said attachments are of a different metal than the utensils, whereby the attachments are securely and permanently held in fixed relation to the utensil, so that there is no opportunity for the attachment to work loose or become detached, and to these ends my invention comprises the novel features hereinafter set forth and claimed.

In the accompanying drawing Fig. 1 is a plan view of a portion of a cooking utensil, partly broken away, showing my invention applied thereto, the attachment in this case being in the form of a handle; Fig. 2 is a vertical section of same; Fig. 3 is a face view, the handle being shown in section; Fig. 4 is a view of the handle removed; Fig. 5 is a view of the handle inserted in the dovetail seats of the attachment plate; Fig. 6 is a like view showing the attachment plate closed around the inner ends of the handle; Fig. 7 is a plan view of the attachment plate as it is stamped out; and Fig. 8 is a top view of same.

As my invention is particularly applicable to the securing of steel handles, ears, etc., to aluminum utensils, I will describe my invention more particularly with reference to such use, although I do not wish to confine it exclusively to aluminum utensils.

The numeral 2 designates a portion of a suitable utensil formed of aluminum or other metal to which the handle 3 is to be secured. In a utensil of this character, such as a sauce-pan, a rigid handle is employed, and this handle is preferably made of steel in the form of a heavy gauge wire with a certain amount of resiliency. The handle is bent in the form of the letter U with the inwardly extending bends 4 near its inner end, and beyond these bends the inner ends 5 are bent downwardly and are preferably tapered and flattened to form the dove-tails 6. The attachment-plate 7 is formed of the same material as the utensil 2 which, in the present case, is formed of aluminum. This attachment-plate is placed in a suitable press and is given a slight curve as at 8 to conform to the curve of the utensil 2, and at the same time the dove-tail seats 9 are formed therein. The plate 7 is then bent along the line 10 in the form indicated in Fig. 5, whereupon the downwardly extending ends 5 of the handle 4 are inserted in the dove-tail seats 9 of said plate, and fit snugly therein. The plate is then further compressed to the form indicated in Fig. 6, by which the ends of the handle are securely locked in said plate and enshrouded thereby.

The plate with the handle attached in this manner is then welded to the side of the utensil by means of the oxy-acetylene flame, or any other suitable welding process, by which the attachment-plate becomes an integral part of the utensil, and all liability of the plate working loose or becoming detached is obviated. This welding is indicated by the numeral 11.

But even if the plate 7 is only riveted to the utensil, as said plate is of the same metal as the utensil there is no unequal expansion and contraction, and consequently not the liability of the plate working loose.

The dove-tailed ends 6 of the handle fitting in the dove-tail seats 9 of the attachment-plate 7 unites the handle with the plate in such a manner that the handle cannot be withdrawn, and as the aluminum attachment-plate 7 is welded to the aluminum utensil there is no unequal expansion and contraction of these two parts, and at the same time the handle, which is formed of spring steel, has the strength and wearing qualities of that metal, while at the same time the resiliency of the steel permits the handle to expand and contract in itself, without in any way affecting its connection with the utensil.

What I claim is:

1. An attachment for a cooking or other utensil of a different metal from that of the utensil, said attachment having a downwardly extending enlarged inner end portion, a plate of the same material as said utensil having a seat to receive said enlarged portion of said attachment, said plate being bent to enclose said enlarged portion and welded to said utensil.

2. An attachment for a cooking or other utensil of a different metal from that of the utensil, having a downwardly extending dove-tailed portion at its inner end, and a plate of the same metal as said utensil having a correspondingly shaped seat to receive said dove-tail, said plate being bent to enclose said end portion of said attachment and welded to said utensil.

3. An attachment for cooking or other utensil of a different metal from that of the utensil, formed of a piece of spring metal bent in the form of a U, the ends of said metal being dove-tailed, and a plate of the same metal as the said utensil having dove-tailed seats to receive the ends of said attachment, said plate being bent to enclose said dove-tailed portion and welded to said utensil.

In testimony whereof, I, the said EDWARD M. CHANDLER, have hereunto set my hand.

EDWARD M. CHANDLER.

Witnesses:
HENRY HOLZ,
JOHN F. WILL.